UNITED STATES PATENT OFFICE 2,551,541

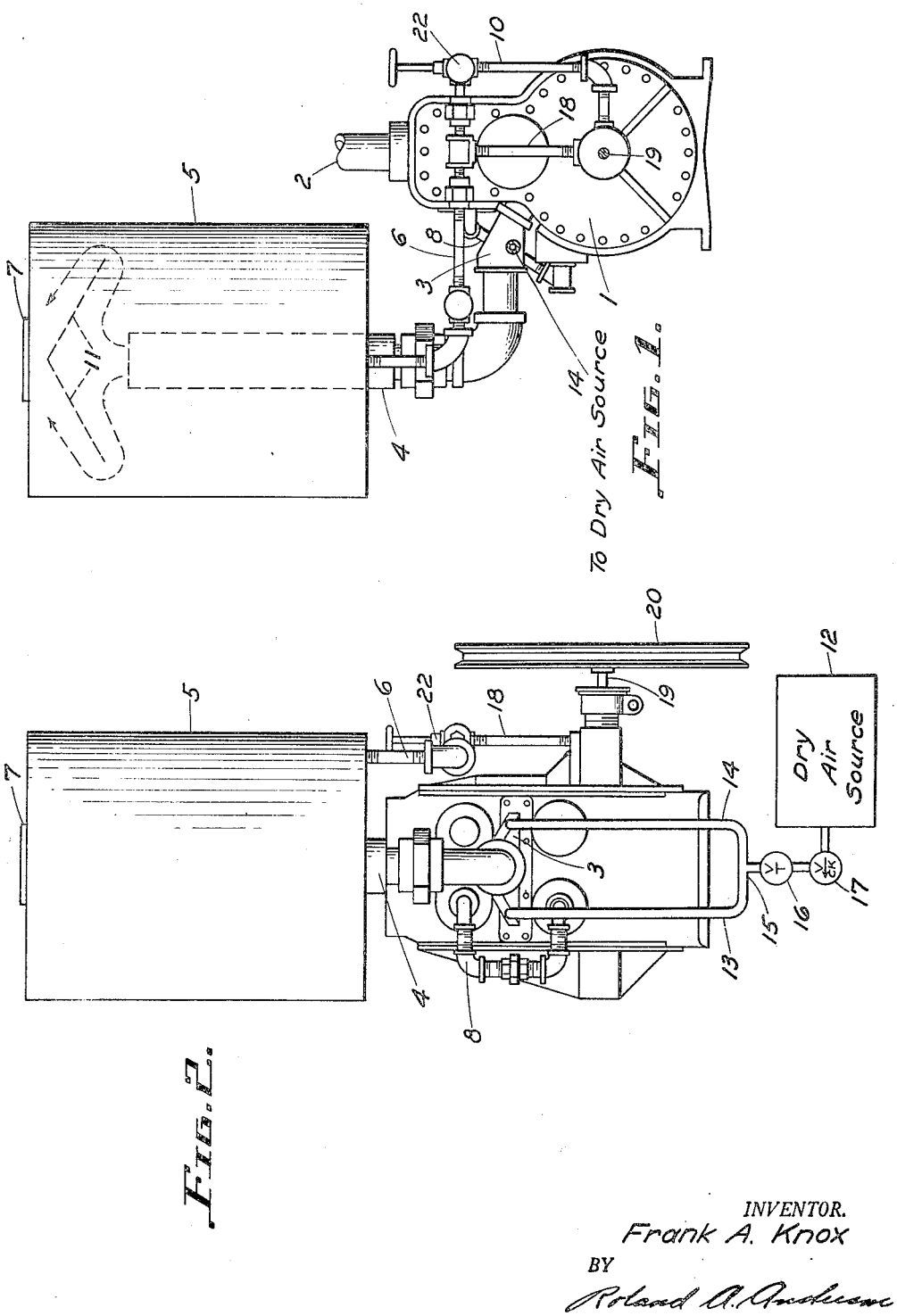

VACUUM PUMPING METHOD WITH MECHANICAL OIL SEALED PUMPS

Frank A. Knox, Oak Ridge, Tenn., assignor, by mesne assignments, to the United States of America as represented by the United States Atomic Energy Commission Application September 28, 1948, Serial No. 51,492

4 Claims. (Cl. 230—1)

This invention relates to vacuum pumping in high vacuum systems such as the high vacuum systems employed in connection with the electromagnetic mass separation of isotopes, for instance, uranium isotopes. In producing a high vacuum it is necessary in this category of equipment that there are two stages of vacuum. One is produced by rotary mechanical pumps, and one is produced by diffusion pumps, the two types of pumps being connected in series with each other. The rotary mechanical pumps may be of any of various types of pumps commercially known and used for this purpose such as the rotary type Kinney, Stokes, Beach-Russ, or other similar pumps. The Kinney pump is a well known type of pump wherein an eccentric member rotates in a circular chamber so as to compress a fluid in the chamber and force it out an outlet opening. The rotary member operates with oil in the chamber which acts both as a seal and a lubricant, the oil forming a film to provide a seal between the rotary member and the chamber in which it operates. This type of pump pumps the oil as well as the various gases being exhausted from the chamber in which the vacuum is being produced. The mixture of oil and gases or vapors is pumped into an oil separator wherein the gases and vapors are released and the oil is trapped and returned to the pump for recirculation.

In any pumping system for the production of high vacuums a serious problem is presented by the presence of water and of other vapors in the chamber being evacuated and in the vacuum lines, especially during the pump-down period. This high vapor pressure material condenses in the oil and recirculates through the pump where it revaporizes and thus interferes with the action of the pump. This problem in the past has commonly been met by the utilization of a cold trap containing solid $CO_2$ and a heat transfer liquid such as acetone, trichlorethylene or butyl Cellosolve in the vacuum line between the diffusion pump and the mechanical pump. Such a trap prevents a large percent of the water vapor which would impair the pumping efficiency from entering and condensing in the mechanical pump oil.

The disadvantage of the pumping system which uses the Dry-Ice dehydrator is that the trap requires frequent attention. It occupies a relatively large space and increases the length of the line between the pump and chamber to be evacuated, thus creating more possibilities for leaks. A further disadvantage in the use of a cold trap is the cost of operation, for Dry Ice must be added to the trap at frequent intervals; and the pumping system must be frequently shut down for short periods in order that the trap may be removed for cleaning.

My invention comprises a method of operating a pumping system wherein relatively dry air or any relatively dry gas is introduced into the rotary mechanical pump at a point on the atmospheric side of the rotor and exhaust valve so that it continuously removes water vapor from the exhaust oil; and a dry film, that is, one free of water, is maintained on the rotor. Thus, the need for the cold trap and the attendant relatively long lines is obviated and the pump is enabled to operate more efficiently as a result. The cost of operation of the system is considerably reduced since the oil need be changed less frequently and the cost of maintaining the traps and the materials used therein is eliminated.

In accordance with the foregoing, an object of my invention is to provide a method in high vacuum pumping systems utilizing rotary mechanical pumps wherein dry air or gas is introduced into the outlet of the pump in order to prevent condensation of otherwise condensable vapors therein and to thereby avoid such condensate being mixed with the pump oil and being returned to the pump.

Another object of my invention is to provide a mechanical rotary pump of the type wherein oil is pumped with the vapors which the pump ordinarily transfers, the oil being separated from the vapors outside the pump and returned thereto and the pump outlet having associated therewith a source of dry air or other gas which is admitted to the outlet for diluting the vapors therein and preventing their condensation. Further objects and advantages of my invention will become apparent from the following detailed description and annexed drawings wherein Fig. 1 is a view of a rotary mechanical pump having my invention embodied therein. Fig. 2 is another view of the rotary mechanical pump of Fig. 1.

Referring to the drawings, Fig. 1 is a side elevation of one type of rotary mechanical pump which may be the Kinney type of pump, previously referred to. Air, or gases, from the chamber being evacuated, enter the pump chamber 1 through suction manifold 2 and exit through exhaust or outlet manifold 3 and pipe 4 into oil separation tank 5. Oil is continuously returned from the oil separator tank 5 to the pump through line 6 by way of either feed 19 or 18, and it serves to lubricate and cool the pump as well as to effect a seal between the rotor of the pump and the cylinder or chamber in which the rotor operates. A valve 22 is provided in feeder line 10 for the purpose of controlling the oil flow therethrough. Baffles 11 are provided in the upper part of the oil separator 5 and air, water vapor, and other gases are discharged from the separator through the exhaust opening 7. The pump is driven through shaft 19 and pulley 20 in a conventional manner. Connection 8 distributes the coolant liquid water between upper and lower jackets of chamber 1.

Dry air is provided from a source which may be a blower or other auxiliary means indicated at 12. This air is conveyed through manifold 15 into the exhaust manifold 3 of the pump through pipes 13 and 14. The manifold 15 is connected to the dry air source 12 through a throttling valve 16 and a check valve 17, as shown in Fig. 2. The dry air may be introduced into the pump outlet at various points along pipe 4, however, best results are obtained when the dry air inlet is located in or near the exhaust manifold thereby obtaining a more effective mixing of oil and air in the exhaust manifold and exhaust pipe, and resulting in better removal of water vapor and other gases of relatively high vapor pressure which are capable of condensing or dissolving in water. Exhaust gases are discharged at 7, as pointed out above, and oil which is substantially free of condensable vapors is collected in the oil separator.

The quantity of dry air required to achieve the desired result will vary with the size of the pump, the quality, state, and type of vapor being pumped, and the dryness of the air. Enough air should be supplied to dilute the vapors being pumped to such an extent that the air supplied will be saturated with these vapors. This amount of air represents the minimum desired volume of air to be supplied and it is desirable that some excess be provided.

An important advantage of the method of operation of my invention is that the pump oil need not be purified as frequently as when the Dry Ice dehydrator trap is used. In using a Dry Ice trap, it has been found that it was often necessary to change the pump oil after approximately 8 hours of operation. When using dry air introduced in to the exhaust manifold in lieu of the use of a Dry Ice trap, it was not necessary to change the oil more often than once in a week of continuous operation. It has also been found that as a result of the use of dry air in the pump outlet that constant pumping conditions can be maintained over relatively long periods of time, whereas otherwise there were considerable pressure fluctuations. The dry air additionally operates to continuously remove corrosive substances which are usually present in the gases being pumped such as $Cl_2$, $HCl$, or other condensable vapors which corrode the pump parts if allowed to be absorbed by the pump oil.

From the foregoing those skilled in the art will be readily able to observe the manner of compounding and practicing my invention and the advantages thereof will be readily apparent.

The single embodiment of my invention which I have disclosed herein is representative of one of its preferred forms, and it is to be understood that various modifications and changes may be made in the invention by those skilled in the art. All such variations and equivalents are intended to come within the scope of the claims attached hereto.

Having thus described my invention, I claim:

1. In the operation of rotary type high vacuum pumps employing oil in a cycle involving pumping out with the vapors exhausted therefrom and then recovering the oil for recycling, the improvement comprising the step of admitting dry gases into the exhaust outlet of the pump to dilute condensable vapors being discharged from the pump whereby said vapors are prevented from condensing and being recirculated through the pump.

2. In a rotary type of mechanical pump wherein oil is maintained in the pump and is pumped out with the vapors being transferred by the pump and is then recirculated through the pump, the improvement comprising a source of dry gas having communication with the outlet of the pump whereby the vapors are evaporated and removed from the oil so that only vapor-free oil is returned to the pump.

3. A rotary type mechanical pump wherein oil is maintained in the pump and is pumped out with the vapors being transferred by the pump and is then recirculated through the pump comprising an exhaust manifold on the pump, a separation tank in communication with the manifold, a source of dry gases, and a line joining the source to said manifold for introducing said gases into the vapors exhausted from said manifold to said tank for removing moisture therefrom.

4. In a rotary type mechanical pump wherein oil is maintained in the pump and is pumped out with the vapors being transferred by the pump and is then recirculated through the pump, an exhaust manifold on the pump, a separation tank spaced from and joined to and in communication with the manifold, a source of dry gases, and means for introducing the gases from said source into the manifold for contact with the exhaust vapors to remove moisture therefrom, said means including a plurality of lines for communication with the source and extending into the manifold adjacent the pump.

FRANK A. KNOX.

No references cited.